March 1, 1949. J. VAN DER WINDT 2,463,129
MACHINE FOR WELDING TOGETHER PIECES OF METAL WIRE
Filed July 3, 1946

INVENTOR
JAN VAN DER WINDT
BY G. F. Neuderoth
ATTORNEY

Patented Mar. 1, 1949

2,463,129

UNITED STATES PATENT OFFICE 2,463,129

MACHINE FOR WELDING TOGETHER PIECES OF METAL WIRE

Jan van der Windt, Eindhoven, Netherlands, assignor to Hartford National Bank and Trust Company, Hartford, Conn., as trustee Application July 3, 1946, Serial No. 681,178
In the Netherlands August 4, 1943

Section 1, Public Law 690, August 8, 1946
Patent expires August 4, 1963

4 Claims. (Cl. 219—4)

This invention relates to the welding of metal wire in end to end relationship with the aid of a condenser battery discharging across the wire ends to be joined. Welding of this type, socalled percussion welding, is particularly suitable for connecting thin metal wires, such as used, for example, as supply wires for incandescent lamps and electronic tubes. Such a supply wire has an external portion, located outside the lamp vessel, a lead-through portion mostly sealed in glass, and an internal conducting wire. These different wire portions must satisfy different mechanical and physical requirements, so that it is frequently advisable to use different materials for this purpose. As a lead-through wire through a glass wall molybdenum is desirable since this material permits a permanent gastight junction to be made in the glass wall. Outside the lamp copper wire can be used, while inside the lamp the use of nickel wire is sometimes desirable. Three pieces of wire of different materials can be joined together by means of an electric weld. However, the different materials impose different requirements as regards the current strength permissible. Consequently, it is customary to effect these welds in separate percussion-welding machines.

According to the invention, an important simplification of the manufacture of such composite wires is obtained by joining the pieces of wire in the same phase of operation, but establishing the different welded joints one after the other with the aid of discharges of different batteries of condensers. On the one hand, an important economy of time is thus obtained, since the three pieces of wire are now joined together in the same welding machine. At the same time, the different requirements as regards the strength of the welding current can be met, since separate batteries of condensers are used for the different welds.

The wire welding machine of the invention is characterized by two separate electric circuits, each including a battery of condensers, these batteries having one pole in common and their other two poles electrically separated. The common pole is connected to the pinch or support for the middle piece of the three pieces of wire to be joined. Each of the two separate poles is connected to one of the two other wire ends, which are initially electrically insulated from each other. As the two welds are not obtained at the same time, but one after the other, the current strength through the first weld will be solely determined, when making this weld, by the discharge of the battery of condensers connected in parallel to it. The charge of the other battery of condensers is also connected to this weld on one side, it is true, but the other side is insulated therefrom. When making the second weld, the first battery of condensers is discharged and short-circuited by the first weld, so that this cannot act upon the second weld.

In order that the invention may be clearly understood and readily carried into effect, it will now be explained more fully with reference to the accompanying drawing.

Figures 1, 2:
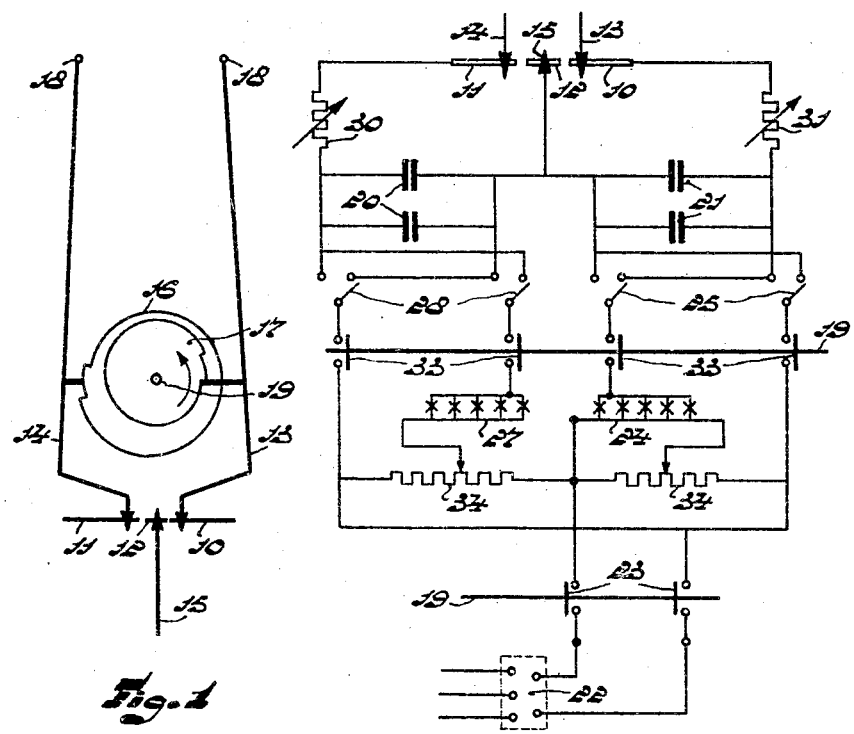
Fig. 1 shows, partly diagrammatically, the construction of the support for the three pieces of wire.
Fig. 2 is the circuit diagram of the two halves of the welding apparatus.

In Fig. 1, 10 and 11 designate the two outer pieces of wire which constitute, for example in an incandescent lamp, the connecting wire outside the bulb and the supply wire inside the bulb respectively. In between these two pieces there must be welded a short wire 12 which must be established in a gas-tight manner in the walls of the lamp. In the wire-welding machine these three pieces of wire are held in three different holders 13, 14 and 15, which are electrically insulated from one another and of which the holder 15 has a fixed position in the machine; the holders 13 and 14 pivoted in points 18 can, however, be moved to and fro under the influence of two cam discs 16 and 17, which are arranged on the same driving shaft 19, but with such a relative phase shift that at first the holder 13 is moved towards the holder 15 and only then the holder 14. The holders 13, 14, and 15 are included in the two electric circuits of the welding apparatus shown in Fig. 2. These two circuits are substantially constituted by two batteries of condensers 20 and 21 which can be charged from a common source 22 of direct current, in this case a rectifier connected to three-phase current mains. This charge is effected periodically some time after the two preceding welds have been made, since on the same shaft 19, having cam discs 16 and 17, there is arranged a switch 23 by which during a short time the two batteries of condensers are connected in parallel to the source 22 of direct current with the interposition of current limiting resistances 27 and 24 respectively. After the batteries of condensers have been charged, but before the welding has set in, the switch 23 re-opens, in order to prevent the rectifier from sending current through the weld to be made.

Between the source of direct current and each battery of condensers there are provided reversing switches 28 and 25 respectively. This permits the direction in which the condensers are charged to be reversed and consequently the direction of current, when making the weld, to be established as desired. In fact, with some combinations of metals the weld is realized better if one metal only forms the positive pole of the weld, but in the case of a combination of one of these metals with another metal a different direction of current may be desirable. The strength of the welding current may be controlled for the two welds in common by an increase or a reduction of the voltage of the rectifier 22. The voltage of the battery of condensers 20 can further be controlled separately with the aid of the potentiometer 34. The variation of the current flowing through each weld can be controlled separately with the aid of variable resistances 30 and 31 respectively. The current strength through each weld, too, can be controlled by varying the capacity of each of the batteries of condensers separately.

The two electric circuits, each of which comprises a battery of condensers, have one pole in common, i. e. that side of the batteries of condensers which is connected to the holder 15. The other poles of the two batteries of condensers are electrically separated from each other when the charge has finished and the switch 23 has re-opened. These two poles are connected to the holders 13 and 14 respectively. First the holder 13 approaches the holder 15, and the weld between the wires 10 and 12 is made, then by a similar movement of the holder 14, the weld between the wires 11 and 12 is established. The two circuits 20 and 21 will not act electrically upon each other, since their parallel connection on the side of the rectifier is interrupted before the manufacture of the first weld begins due to the presence of a set of switches 33 between each condenser circuit and the rectifier. These switches are also opened by the shaft 19 of the machine before the welding has started and are closed again after the welding is completed. Consequently, the two welds are made independently of each other, and the conditions for each of these welds can be fulfilled independently of each other.

What I claim is:

1. An arrangement for forming a weld between one end of a first wire and one end of a second wire and a weld between the other end of said first wire and one end of a third wire comprising, a first storage capacitance, a second storage capacitance, a first resistance, a second resistance, each of said storage capacitances having one end connected in common with said first wire, the other end of said first storage capacitance being connected to said second wire through said first resistance, the other end of said second storage capacitance being connected to said third wire through said second resistance, a voltage source for charging said storage capacitances, said voltage source being connected to said storage capacitances in parallel, switch means operative to disconnect said voltage source from said storage capacitances, and means arranged in a first position to operate said switch means and in a second position to successively advance said second wire to contact said first wire to discharge said first storage capacitance to form a weld between said first and second wires and to advance said third wire to contact said first wire to discharge said second storage capacitance and form a weld between said first and third wires.

2. An arrangement for forming a weld between one end of a first wire and one end of a second wire and a weld between the other end of said first wire and one end of a third wire comprising, a first storage capacitance, a second storage capacitance, a first resistance, a second resistance, each of said storage capacitances having one end connected in common with said first wire, the other end of said first storage capacitance being connected to said second wire through said first resistance, the other end of said second storage capacitance being connected to said third wire through said second resistance, a voltage source for charging said storage capacitance, said voltage source being connected to said storage capacitances in parallel, means to reverse the polarity of said voltage source as applied to said storage capacitances, switch means to disconnect said voltage source from said storage capacitances, and means adapted in a first position to operate said switch means and in a second position to successively advance said second wire to contact said first wire to discharge said first storage capacitance and form a welded connection between said first and second wires and to advance said third wire to contact said first wire to discharge said second storage capacitance and form a welded connection between said first and third wire.

3. An arrangement for forming a weld between one end of a first wire and one end of a second wire and a weld between the other end of said first wire and one end of a third wire comprising, a first storage capacitance, a second storage capacitance, a first resistance, a second resistance, each of said storage capacitances having one end connected in common with said first wire, the other end of said first storage capacitance being connected to said second wire through said first resistance, the other end of said second storage capacitance being connected to said third wire through said second resistance, a voltage source for charging said storage capacitances, said voltage source being connected to said storage capacitances in parallel, means to independently regulate the magnitude of charge of each of said storage capacitances, switch means to disconnect said voltage source from said storage capacitance, and means adapted in a first position to operate said switch means and in a second position to successively advance said second wire to contact said first wire to discharge said first storage capacitance and form a welded connection between said first and second wires, and to advance said third wire to contact said first wire to discharge said second storage capacitance and form a welded connection between said first and said third wires.

4. An arrangement for forming a weld between one end of a first wire and one end of a second wire and a weld between the other end of said first wire and one end of a third wire comprising, a first battery of storage condensers connected in parallel, a second battery of storage condensers connected in parallel, a first rheostat, a second rheostat, each of said batteries of storage condensers having one end connected in common with said first wire, the other end of said first battery of storage condensers connected to said second wire through said first rheostat, the other end of said second battery of storage condensers connected to said third wire through said second rheostat, a voltage source for charging said batteries of storage condensers, said voltage source being connected to said batteries of storage condensers in parallel, a first switching means to reverse the polarity of said voltage source as applied to said batteries of storage condensers, a resistance means to independently regulate the magnitude of charge of each of said batteries of storage condensers, a second switching means operative to disconnect said voltage source from said batteries of storage condensers, and cam means adapted in a first position to operate said second switching means and in a second position to successively advance said second wire to contact said first wire to discharge said first battery of storage condensers and form a welded connection between said first and second wires and to advance said third wire to contact said first wire to discharge said second battery of storage condensers and form a welded connection between said first and third wires.

JAN van der WINDT.

REFERENCES CITED

The following references are of record in the file of this patent:

UNITED STATES PATENTS

| Number | Name | Date |
|---|---|---|
| 1,299,150 | Dyer | Apr. 1, 1919 |
| 1,722,195 | Bumstead | July 23, 1929 |
| 2,034,560 | Bumstead | Mar. 17, 1936 |
| 2,137,181 | Quachenbush | Nov. 15, 1938 |

FOREIGN PATENTS

| Number | Country | Date |
|---|---|---|
| 548,618 | Great Britain | Oct. 16, 1942 |